UNITED STATES PATENT OFFICE.

IRVING F. LAUCKS, OF SEATTLE, WASHINGTON, ASSIGNOR OF ONE-HALF TO FRANK C. GREENE, OF DENVER, COLORADO.

VARNISH AND METHOD OF MAKING SAME.

1,413,666.   Specification of Letters Patent.   Patented Apr. 25, 1922.

No Drawing.   Application filed March 7, 1919. Serial No. 281,228.

*To all whom it may concern:*

Be it known that I, IRVING F. LAUCKS, a citizen of the United States, and a resident of Seattle, county of King, and State of Washington, have invented a new and useful Improvement in Varnishes and Methods of Making Same, of which the following is a specification, the principle of the invention being herein explained and the best mode in which I have contemplated applying that principle, so as to distinguish it from other inventions.

As is well known, resins are an essential ingredient in the manufacture of ordinary varnishes, the so-called fossil resins being esteemed as the most valuable because they have undergone certain changes from their natural state, probably due to heat and pressure. Such fossil resins, however, are mostly derived from deposits in the Orient and other out of the way places, so that, in addition to requiring to be dug out of the ground and prepared, they have to be shipped long distances. It is true that certain cheaper grades of varnish are made from the rosin obtained from the distillation of Southern turpentine, but so far as I am aware this has constituted the only other source of this essential material which has ever been commercially utilized in the making of varnishes.

It is a well known fact that coal, particularly lignite and bituminous coal, contains relatively large amounts of resinous matter, sometimes as high as fifty per cent or more. Furthermore, it is obvious that such coal resin, as I shall term such matter, has been subjected to the agencies of heat and pressure in a fashion comparable with that to which the so-called fossil resins have been subjected, with the result that such coal resin, as might be expected, is found to have the very qualities that are desired by the varnish maker. A serious difficulty, however, is encountered when it is attempted to extract these coal resins, and so far as I am aware the present method is the first one presented that is commercially feasible, and that recovers the resin without impairing its quality.

The object of the present invention, in other words, is to provide a method for extracting or recovering resins from coal, at the same time utilizing them as one of the ingredients in the manufacture of varnish.

To the accomplishment of the foregoing and related ends, the invention, then, consists of the steps and novel product resulting therefrom hereinafter fully described and particularly pointed out in the claims, the following description setting forth in detail certain steps and ingredients embodying the invention, which steps and ingredients, however, constitute but one of the various ways in which the principle of the invention may be used.

Varnishes may be divided into two classes, viz., spirit varnishes and oleo-resinous varnishes. The former harden by mere evaporation of the solvent, such as benzol, etc., leaving the dissolved substance, usually a resin such as described above, behind, to constitute the finished coating. The latter, i. e., the oleo-resinous varnishes, which constitute a mere improvement of the two classes, contain a drying oil, like linseed oil, in which is dissolved a quantity of a resinous substance, the latter being then thinned with turpentine or other more volatile substance, like benzine, etc. The hardening in the case of this type of varnish is due to the absorption of oxygen by the drying oil used, the resin that is added serving to make the coating or film harder, more glossy and lustrous. The present improvements relate more particularly to the preparation of the latter, i. e., oleo resinous varnishes; as will now be explained.

In carrying out my improved method or process, as applied to the making of an oleo-resinous varnish, the coal is first dried from adherent moisture and pulverized. I preferably use coal of a fineness sufficient to pass through a 40-mesh screen, though it is not necessary that it be ground quite as fine as this. The particles of resin, however, included in the coal should be fairly fine so that they will melt quickly. The coal is then heated above the melting point of such resin, and kept at that temperature for a sufficient time so that the resin particles become thoroughly softened and melted. When this stage is reached, the desired amount of oil is heated to about the same temperature as the coal and thereupon added to the latter with stirring. The temperature is then allowed to drop somewhat, as the first temperature would ordinarily be too high to subject the oil to for any great length of time. The mixture of oil and coal is, however, held at the lower temperature for some time, so that, in other words, the oil and resin become thoroughly intermixed, or rather the one incorporated in the other. If this time is too short the resin will tend to separate out on cooling and leave a cloudy film when the varnish is dry, but from thirty to forty minutes will ordinarily be sufficient for this stage in the operation. At the end of such stage the mixture is cooled to approximately 170° C., and the required amount of turpentine or equivalent more volatile substance stirred in as the remaining ingredient of the varnish.

It only remains then to free such varnish from the coal residue, which is done by adding a light solvent, such as benzol, benzine or other cheap, light solvent, in which oil, resin and turpentine are freely miscible. Taking benzol as an example, the latter is added when the varnish mixture is just under 80° C., is well stirred in, and the mixture then allowed to settle; whereupon the liquid mixture is filtered from the solid matter, and finally the excess of benzol or other solvent thus last added is distilled off, leaving the finished varnish in the still.

The foregoing general method has been successfully applied to the treatment of various kinds or types of coal, ranging from lignite to bituminous. It is of course necessary that the coal used should contain a sufficient amount of desirable resin, coals, even of the same general class, varying considerably in such resin content as well as in the character of the resin. It will further be understood that, depending upon the quantity and character of resin, particularly its melting point, as well as upon the kind of varnish it is desired to produce, the details of such general process will be correspondingly varied.

As a specific illustration, I give the following detailed procedure in connection with a lignite coal which contained twenty-five per cent resin, extractable by my present improved method. Two parts of such coal, finely ground as previously described, were heated to 350° C., and held there for one-half hour, the resin melting at from 280° to 300° C. One part of linseed oil (boiled) which had been previously heated to 330° C., was then added to such coal at 350° C., with stirring, following which the mixture was cooled to from 280° to 300° C. and held there for approximately forty minutes with stirring, after which the cooling was continued to 170° C. and one part of turpentine added, and finally the mixture cooled to 70° C. and five parts of benzol added, the stirring being continued throughout these last named steps. After the addition of the benzol the mixture was allowed to settle, the liquid separated from the solid matter by filtration (preferably with a filter press) and the filtrate distilled to recover the benzol, leaving the varnish behind in the still. With the exercise of proper care practically one hundred per cent of the benzol or other solvent used in the final extraction of the varnish from the coal residue may be recovered, and used over and over again.

In the specific case just described I obtained a varnish containing one part resin to two parts oil, which is about as much resin as is ordinarily used in a varnish of the class in question. In other words, a varnish with as high a resin content as indicated, would be suitable for interior use; while for varnish for exterior use, less resin and more oil would be used. The amount of turpentine, or other thinner, will also depend upon the way in which the varnish is to be used.

Just as a large number of varnishes are at present made for various purposes using other resins, so the variety of varnishes obtainable by my present improved process, utilizing resins derived from coal, is practically unlimited. Not only may different proportions of ingredients, as just stated, be employed, but the resins from different coals are found to possess different properties. Varnishes made in the fashion described have been subjected to a number of tests to show their suitability for various practical uses, and they are found to be equal to present commercial varnishes; in fact in some respects superior, since the resin of coal is better than the best of the fossil resins now used for varnish making. The cost of a varnish produced in accordance with my method is of course very much less than that of one in which so-called fossil resins are employed.

It will be understood that in referring to the resins in coal, I refer generally to the substance or ingredient that may be extracted in the fashion hereinbefore set forth, without implying by the use of the term "resin" any particular chemical composition for such ingredient, and without implying necessarily that the latter is identical with the resins obtained from other sources that are at present on the market.

Similarly it will be understood that linseed oil is illustrative of but one kind of vehicle, and turpentine, similarly illustrative of but one kind of thinner that may be used in my process and product.

Other modes of applying the principle of my invention may be employed instead of the one explained, change being made as regards the composition and method herein disclosed, provided the ingredients or steps stated by any of the following claims or the equivalent of such stated ingredients or steps be employed. I therefore particularly point out and distinctly claim as my invention:—

1. As a new composition of matter, a varnish consisting of resinous matter from coal in substantially unchanged form combined with a liquid vehicle.

2. As a new composition of matter, a varnish consisting of resinous matter from coal in substantially unchanged form combined with a drying oil.

3. As a new composition of matter, a varnish consisting of resinous matter from coal in substantially unchanged form combined with a drying oil and an ingredient serving as a thinner.

4. As a new composition of matter, a varnish consisting of resinous matter from coal in substantially unchanged form combined with linseed oil and turpentine.

5. As a new composition of matter, a varnish consisting of resinous matter from coal, in substantially unchanged form and substantially free from cellulosic, humic and other non-resinous ingredients of such coal, and a vehicle combined with such resinous matter.

6. Method of making varnish, the step which comprises directly treating coal with a vehicle capable of combining with the resinous matter in such coal to form a varnish.

7. The method of making varnish, which comprises directly treating coal with a vehicle capable of combining with the resinous matter in such coal to form a varnish, adding an ingredient serving as a thinner, and separating out the residual solid matter.

8. The method of making varnish, which comprises heating coal with linseed oil, whereby the latter combines with the resinous matter in such coal, adding an ingredient serving as a thinner, and separating out the residual solid matter.

9. The method of making varnish, which comprises heating finely divided coal with linseed oil, whereby the latter combines with the resinous matter in such coal, adding a suitable thinner, then a light solvent, filtering out the residual solid matter, and then distilling off such solvent from the filtrate.

10. The method of making varnish, which comprises heating finely divided coal until the resin therein melts, intermixing a quantity of linseed oil previously heated to approximately the same temperature as such coal, cooling, adding turpentine, and filtering out the residual solid matter.

11. The method of making varnish, which consists in heating finely divided coal until the resin therein melts, intermixing a quantity of linseed oil previously heated to approximately the same temperature as such coal, adding turpentine, adding a light solvent, filtering out the residual solid matter, and then distilling off such solvent from the filtrate, the mixture being cooled before adding such turpentine and light solvent, respectively, to temperatures at which the latter are not too rapidly volatilized, substantially as described.

12. The method of making varnish, which consists in heating finely divided coal to approximately 350° C., intermixing a quantity of linseed oil previously heated to approximately the same temperature as such coal, maintaining the mixture at approximately 300° C. until such oil combines with the resinous matter in such coal, cooling to approximately 170° C. and adding turpentine, cooling further to approximately 70° C. and adding benzol, then filtering out the residual solid matter, and recovering the benzol from the filtrate.

Signed by me, this 19th day of February, 1919.

IRVING F. LAUCKS.